Patented Apr. 21, 1942

2,280,653

UNITED STATES PATENT OFFICE 2,280,653

ADHESIVENESS OF ASPHALTS

Charles Mack, Sarnia, Ontario, Canada, assignor to Standard Oil Development Company, a corporation of Delaware No Drawing. Application August 10, 1935, Serial No. 35,633

7 Claims. (Cl. 106—269)

This invention relates to a process of preparing bituminous compositions which are especially adapted to wet, and adhere to mineral aggregate, metals and other materials.

In the construction of pavements consisting of mineral aggregate, each rock of the mineral aggregate is first provided with a coating of bitumen. The mineral aggregate with the adhering coat of bitumen is then laid and compacted or, in the case of mixed-in-place-roads, redistributed over the surface and compacted. The bitumen must possess sufficient adherence to hold the rocks of the mineral aggregate firmly and tenaciously together. Where mineral aggregate is used that has been first dried by heating, little trouble is experienced in securing a good bond of the bitumen and the rocks of the mineral aggregate except with a siliceous aggregate. Even though the initial bond between bitumen and aggregate is good, subsequent action of weather and water tend to displace the bitumen from the stone, thus causing disintegration. When the mineral aggregate is wet and the surfaces are covered with water, or where the surfaces are porous and the pores are filled with water, and in cases where the mineral aggregate is siliceous in character, difficulty is experienced in obtaining an initial firm bond. Where wet or damp rocks are so coated and then exposed to the weather, the bitumen tends, and actually does separate from the rocks, and once the separation has started, the entire coating of bitumen rapidly separates from the rock. This is true not only with mineral aggregates, but also whenever bitumen is used to coat other materials such as iron pipes which are buried in the ground and thereby maintained in a damp condition, which also tends to cause the bitumen to separate. Likewise when bitumen is used to waterproof structures that are maintained under the surface of the ground, such as cellar walls, a separation of the bitumen and the structure takes place if the bitumen had been used to coat a damp surface.

The object of this invention is to provide a bituminous composition for hot and cold application which will readily coat rocks, iron and other materials.

Another object of this invention is to provide a bituminous composition which will have increased adhesiveness when used to coat surfaces of rocks, metals, etc.

These and other objects of the invention will be readily understood on reading the following description of the invention:

It has been found that if bitumen has incorporated therein certain compounds, the wetting power and the adhesiveness of the resulting composition will be greatly increased over that of the bitumen when used alone. It has been known that in the past, certain soaps have been found which will increase the wetting power of the bitumen but with a lessening of the adhesiveness of the bituminous composition where these soaps are incorporated. The following agents have been found to be especially suitable according to this invention to increase both the wetting power and the adhesiveness of the bituminous compositions wherein they are incorporated.

Esters obtained by the esterification of natural fatty acids, acids from the oxidation of paraffin wax and resinous acids, such as wood rosin with high molecular weight, monovalent alcohols obtained from the oxidation of paraffin wax. The monovalent alcohols used for producing the esters are those having a carbon content of more than 8 carbon atoms and include aliphatic as well as cyclic alcohols. Other ester-containing materials are also suitable, for example, tar still pitch, a residue from the oxidation of paraffin wax, and stearine pitch. The fatty acid salts of trivalent, and higher metals, such as aluminum, ferric iron, titanium and tin, may also be used.

It has also been found that the order of effectiveness of the above agents in the bituminous composition on moist rock is the same as on dried aggregate. The proportion found most effective was 2% by weight based on the asphalt, though other proportions could be used, such as 0.5% to 5%. This bituminous composition is suitable for use both in the hot laid or cold laid type of paving material. It is especially suitable as a coating material for pipes that are to be buried underneath the ground. Also, it has been found to be very effective as a water proofing composition for the walls of structures that are below the surface of the ground and therefore cannot be readily dried.

Various changes and alternative arrangements may be made within the scope of the appended claims, in which it is my intention to claim all novelty inherent in the invention as broadly as the prior art permits.

I claim:

1. Improved asphaltic material for road construction and the like comprising a bituminous binder consisting of bitumen and .5 to 5.0% of an ester of a higher fatty acid and a high molecular weight monohydric alcohol and a siliceous mineral aggregate thoroughly incorporated with the binder.

2. Composition according to claim 1 in which the ester is one produced from alcohol having at least 8 carbon atoms.

3. Composition according to claim 1 in which the ester is produced from a rosin acid and an alcohol of at least 8 carbon atoms.

4. Composition according to claim 1 in which the ester is produced from an acid obtained by the oxidation of paraffin wax, and an alcohol of at least 8 carbon atoms.

5. An improved process for preparing an asphaltic composition useful in road construction and the like, comprising adding to a bitumen a small quantity from .5 to 5.0% of an ester of a higher fatty acid and a high molecular weight monohydric alcohol and coating a siliceous aggregate with said material.

6. Process according to claim 5 in which the ester is produced from a rosin acid and an alcohol of at least 8 carbon atoms.

7. Process according to claim 5 in which the ester is one obtained from an acid produced by the oxidation of paraffin wax and an alcohol of at least 8 carbon atoms.

CHARLES MACK.